United States Patent
Mizuno

(12) United States Patent (10) Patent No.: US 6,752,614 B2
(45) Date of Patent: Jun. 22, 2004

(54) INJECTION MOLDING MACHINE HAVING A DYNAMIC BRAKE APPARATUS PROVIDED FOR AN ELECTRIC DRIVING MACHINE

(75) Inventor: Hiroyuki Mizuno, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 61 days.

(21) Appl. No.: 10/273,173

(22) Filed: Oct. 18, 2002

(65) Prior Publication Data

US 2003/0075819 A1 Apr. 24, 2003

(30) Foreign Application Priority Data

Oct. 19, 2001 (JP) ........................................ 2001-321318

(51) Int. Cl.⁷ .......................... B29C 45/77; B29C 45/80
(52) U.S. Cl. ...................... 425/145; 264/40.1; 425/149; 425/150
(58) Field of Search ................................ 425/145, 149, 425/150; 264/40.1, 40.5, 40.7; 318/439

(56) References Cited

U.S. PATENT DOCUMENTS 5,850,130 A * 12/1998 Fujisaki et al. ............. 318/439

FOREIGN PATENT DOCUMENTS

| EP | 0 488 240 A1 | 6/1992 |
|---|---|---|
| EP | 0 773 623 A1 | 5/1997 |
| JP | 57-160380 | 10/1982 |
| JP | 6-47786 | 2/1994 |
| JP | 9-74781 | 3/1997 |
| JP | 10-136675 | 5/1998 |
| JP | 11-235743 | 8/1999 |
| JP | 2001204184 A | 7/2001 |
| JP | 2002-113737 | 4/2002 |
| JP | 2002166456 A | 6/2002 |

* cited by examiner

*Primary Examiner*—Tim Heitbrink
(74) *Attorney, Agent, or Firm*—Squire, Sanders & Dempsey L.L.P.

(57) ABSTRACT

An injection molding machine includes an electric driving machine, a dynamic brake apparatus which is provided for the electric driving machine and consumes regenerative electric power of the electric driving machine as a load, and a controller configured to output a driving output signal to the dynamic brake apparatus so as to control that the dynamic brake apparatus consumes the regenerative electric power of the electric driving machine, wherein the controller estimates the load to the dynamic brake apparatus based on the driving output signal output to the dynamic brake apparatus and determines whether or not the dynamic brake apparatus is in an overload state based on the estimated load.

10 Claims, 7 Drawing Sheets

INJECTION MOLDING MACHINE HAVING A DYNAMIC BRAKE APPARATUS PROVIDED FOR AN ELECTRIC DRIVING MACHINE

BACKGROUND OF THE INVENTION

1. Field of the Invention

The present invention generally relates to injection molding machines and methods for protecting the injection molding machines. More particularly, the present invention relates to an injection molding machine, such as an electric injection molding machine or a hybrid type injection molding machine, having a dynamic brake apparatus provided for an electric driving machine used as an actuator for an injection apparatus, a mold clamping apparatus or others, and a method for protecting the injection molding machine.

2. Description of the Related Art

An electric driving machine, such as a motor, is used for an electric injection molding machine as a driving source. The motor is also used for a hybrid type injection molding machine that takes in beneficial points of both hydraulic and electric injection molding machines.

In the above mentioned injection molding machines, the motor is driven so that an injection screw is rotated, advanced, and retracted, a moveable platen is advanced and retracted, and an ejector pin of an ejector apparatus for molded articles is advanced and retracted. In addition, dynamic brake apparatuses are provided for various motors of the injection molding machine, as apparatuses for consuming regenerative electric power of the motors.

FIG. 1 is a schematic structural view of a driving circuit of a motor provided for an electric injection molding machine as an example of a conventional injection molding machine.

Referring to FIG. 1, the driving circuit includes a converter part 2, an inverter part 3, a dynamic brake apparatus 5, and a smoothing capacitor 6.

The converter part 2 converts an alternating current being sent from a three-phase alternating current electric power source 1 to a direct current. The inverter part 3 converts the direct current being sent from the converter part 2 to an alternating current, so that the alternating current is supplied to a motor 4. The dynamic brake apparatus 5 is connected to a DC link part 8 provided between the converter part 2 and the inverter part 3. The capacitor 6 is connected to a part of the DC link part 8 provided between the converter part 2 and the dynamic brake apparatus 5.

The dynamic brake apparatus 5 includes a regenerative resistance part 5-1 and a switch element 5-2. Regenerative electric power of the motor 4 is consumed by the regenerative resistance part 5-1. The switch element 5-2 is on-off controlled by a controller 9. The dynamic brake apparatus 5 functions as an apparatus for consuming the regenerative electric power of the motor 4.

In the above mentioned driving circuit, the rotational speed of the motor 4 is reduced so that the motor 4 is made regenerative and a control signal is output from the controller 9. The switch element 5-2 is on-off controlled by the control signal. If the switch element 5-2 is made "on", the regenerative electric power of the motor 4 is consumed by the regenerative resistance part 5-1.

If the regenerative electric power of the motor 4 is high, the dynamic brake apparatus 5 is in an overload state so that the regenerative resistance part 5-1 may be burned. Hence, it is necessary to detect such a overload state and reduce the load on the motor 4 by stopping the operation of the motor 4 or reducing torque or the rotational speed of the motor 4, in order to protect the driving circuit of the motor 4. Because of this, a thermal overload relay 7 is generally provided for the dynamic brake apparatus 5. The thermal overload relay 7 detects that the value of the regenerative electric power of the motor 4 exceeds the designated values. Alternatively, instead of the thermal overload relay 7, an electric current detector or a voltage detector, which is not shown in FIG. 1, detecting that the dynamic brake apparatus 5 is in the overload state, is provided for the dynamic brake apparatus 5.

Meanwhile, it is necessary for the rotational speed of the motor 4 of the above mentioned electric injection molding machine to be controlled to accelerate or decelerate in a short cycle during a process of mold clamping or injection, for example, in order to produce a large number of molded articles in a short period of time efficiently. Because of this, the motor 4 is made regenerative frequently. Therefore, it is very important for the dynamic brake apparatus 5 of the electric injection molding machine to be prevented from being in the overload state due to high regenerative electric power of the motor 4 high, from the point of view that desirable molded articles are produced efficiently.

On the other hand, if a protection exclusive device, such as the above mentioned thermal overload relay 7, the electric current detector, or the voltage detector, is provided in order to protect the dynamic brake apparatus 5 as in the above mentioned conventional electric injection molding machine, a large electric injection molding machine may be required. Such a large machine requires more space and makes manufacturing cost too high.

SUMMARY OF THE INVENTION

Accordingly, it is a general object of the present invention to provide a novel and useful injection molding machine having a dynamic brake apparatus provided for an electric driving machine and method for protecting the injection molding machine, in which one or more of the problems described above are eliminated.

Another and more specific object of the present invention is to provide an injection molding machine and a method for protecting the injection molding machine wherein it is realized that the dynamic brake apparatus provided for the electric driving machine, such as motor, used as an actuator is protected from an overload state in a simple structure.

The above objects of the present invention are achieved by an injection molding machine, including an electric driving machine, a dynamic brake apparatus which is provided for the electric driving machine and consumes regenerative electric power of the electric driving machine as a load, and a controller configured to output a driving output signal to the dynamic brake apparatus so as to control that the dynamic brake apparatus consumes the regenerative electric power of the electric driving machine, wherein the controller estimates the load to the dynamic brake apparatus based on the driving output signal output to the dynamic brake apparatus and determines whether or not the dynamic brake apparatus is in an overload state based on the estimated load.

The above objects of the present invention are also achieved by a method for protecting an injection molding machine, comprising the steps of a) estimating a load to a dynamic brake apparatus provided at the injection molding machine, based on a driving signal input to the dynamic brake apparatus, b) determining whether or not the dynamic brake apparatus is in an overload state based on the estimated load, and c) protecting the dynamic brake apparatus, in a case where it is determined that the dynamic brake apparatus is in the overload state and a term wherein the overload state continues exceeds a predetermined term.

According to the present invention as described above, it is possible to determine with a simple structure whether or not the dynamic brake apparatus is in an overload state, in order to protect the dynamic brake apparatus provided for the electric driving machine from the overload state.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIGS. 2 through 10, of embodiments of the present invention. Electric injection molding machines will be described as examples of the embodiments of the present invention.

Figure 1:
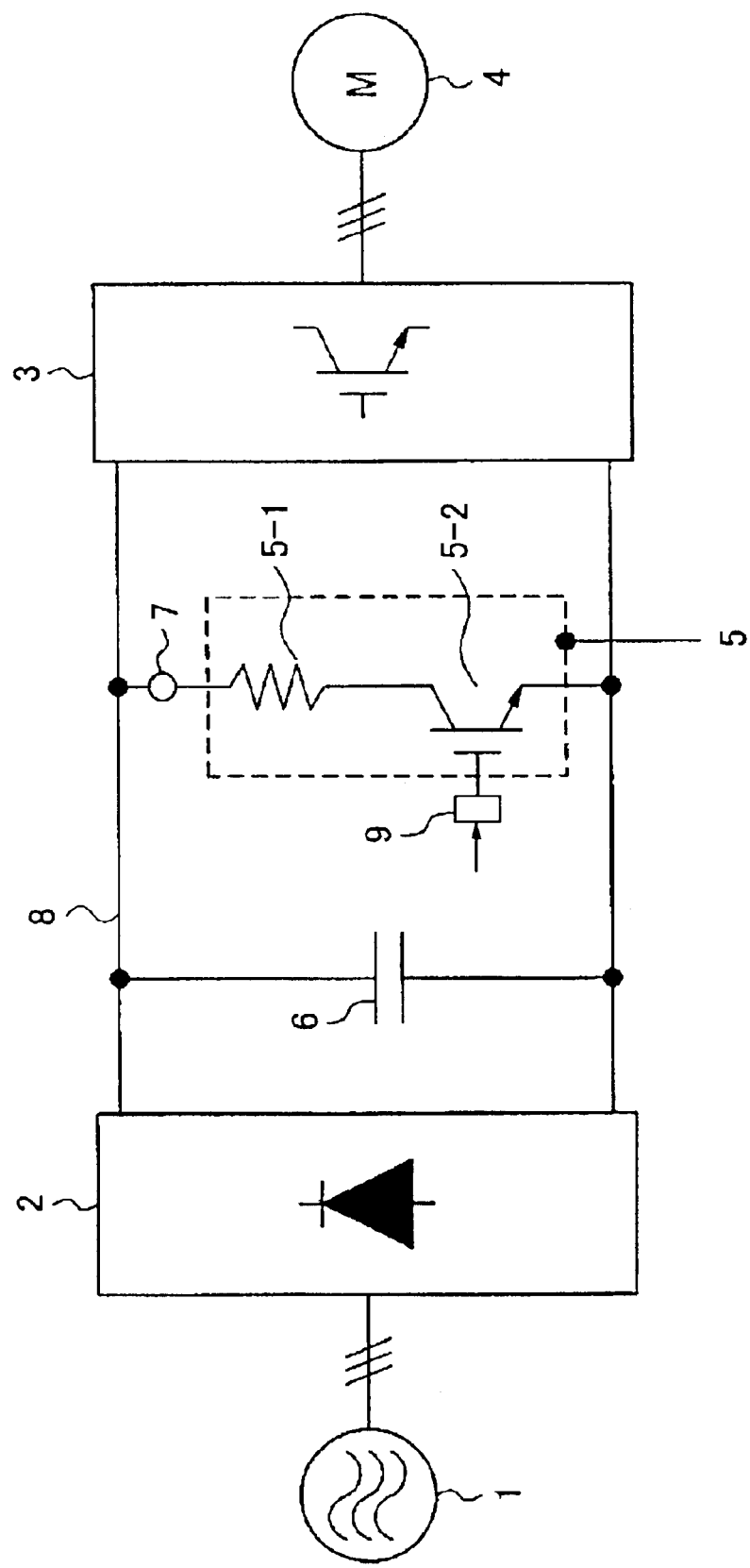
FIG. 1 is a schematic structural view of a driving circuit of a motor provided for an electric injection molding machine as an example of a conventional injection molding machine.
Figure 2:
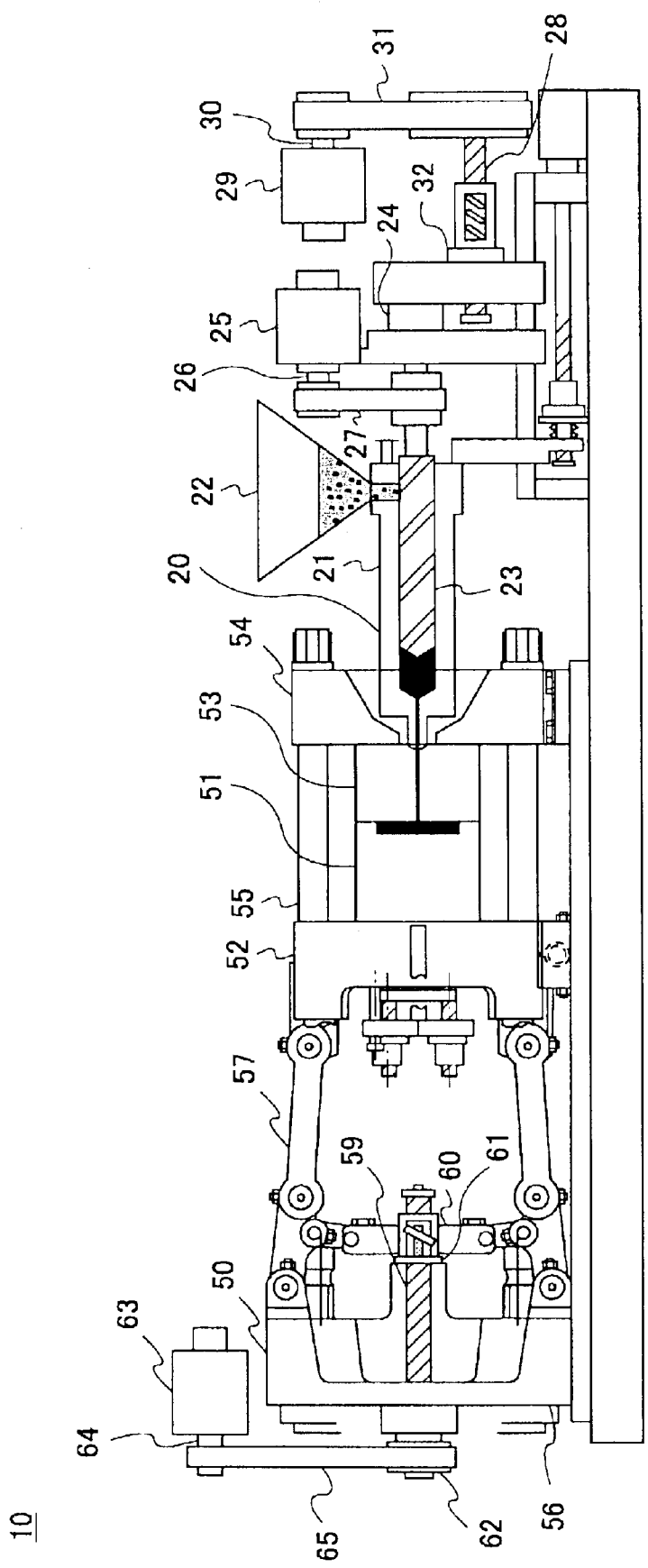
FIG. 2 is a cross sectional view showing a schematic structure of an electric injection molding machine 10 of the first embodiment of the present invention.

FIG. 2 is a cross sectional view showing a schematic structure of an electric injection molding machine 10 of the first embodiment of the present invention. Referring to FIG. 2, the electric injection molding machine 10 includes an injection apparatus 20 and a mold clamping apparatus 50.

The injection apparatus 20 includes a heating cylinder 21. A hopper is disposed on the heating cylinder 21. A screw 23 is disposed inside the heating cylinder 21 so that the screw 23 can be rotated about an axis and can be advanced and retracted.

A rear end part of the screw 23 is supported by a support member 24 so that the screw 23 can be rotated. A metering motor 25 such as a servo motor is equipped at the support member 24 as a driving part. A rotation of the metering motor 25 is transmitted to the screw 23 by a timing belt 27 equipped at an output shaft of the metering motor 25.

The injection apparatus 20 also includes a screw shaft 28 provided parallel to the screw 23 so that the screw shaft 28 can be rotated. An end part of the screw shaft 28 is connected to an injection motor 29 by a timing belt 31 equipped at an output shaft 30 of the injection motor 29. Hence, the screw shaft 28 is rotated by the injection motor 29. A nut 32 fixed to the support member 24 is slidably and matably engaged with a front end part of the screw shaft 28. Accordingly, the injection motor 29 is driven as a driving part in order to rotate the screw shaft 28 by the timing belt 31, so that the support member 24 can be advanced or retracted. As a result of this, the screw 23 can be advanced or retracted.

The mold clamping apparatus 50 includes a movable platen 52 where a movable mold 51 is attached and a stationary platen 54 where a stationary mold 53 is attached. The movable platen 52 is connected to the stationary platen 54 by tie bars 55. The movable platen 52 can slide along the tie bars 55. The mold clamping apparatus 50 also includes a toggle mechanism 57. One end part of the toggle mechanism 57 is connected to the movable platen 52 and the other end of the toggle mechanism 57 is connected to a toggle support 56. A ball screw shaft 59 is supported at a center of the toggle support 56 so as to be capable of rotating.

A nut 61, provided at a cross head 60 that is disposed at the toggle mechanism 57, is slidably and matably engaged with the ball screw shaft 59. A pulley 62 is provided at a read end part of the ball screw shaft 59. A timing belt 65 is stretched and provided between the pulley 62 and an output shaft 64 of a mold clamping motor 63 such as a servo motor.

Accordingly, in the mold clamping apparatus 50, when the mold clamping motor 63 is driven as a driving part, rotation of the mold clamping motor 63 is transmitted to the ball screw shaft 59 as a driving transmission part by the timing belt 65. Furthermore, a motion direction is converted from a rotational motion to a rectilinear motion by the ball screw shaft 59 and the nut 61 so that the toggle mechanism 57 is acted upon. Based on the toggle mechanism 57 being acted on, the movable platen 52 slides along the tie bars 55 so that the movable mold 51 is closed to, clamped to or opened from a stationary mold 53.

As described above, electric injection molding machines (motors) such as the metering motor 25, the injection motor 29, the mold clamping motor 63, or the like are applied as actuators in the electric injection molding machine 10 of this embodiment. Each of an operation of metering, injection, mold clamping, or the like is implemented consecutively at the time of molding.

Meanwhile, when rotational speed of any of the above mentioned motors is reduced, regenerative electric power of the motor is produced. A dynamic brake apparatus is provided for each of the motors of the electric injection molding machine 10, as an apparatus for consuming the regenerative electric power of the motor.

Figure 3:
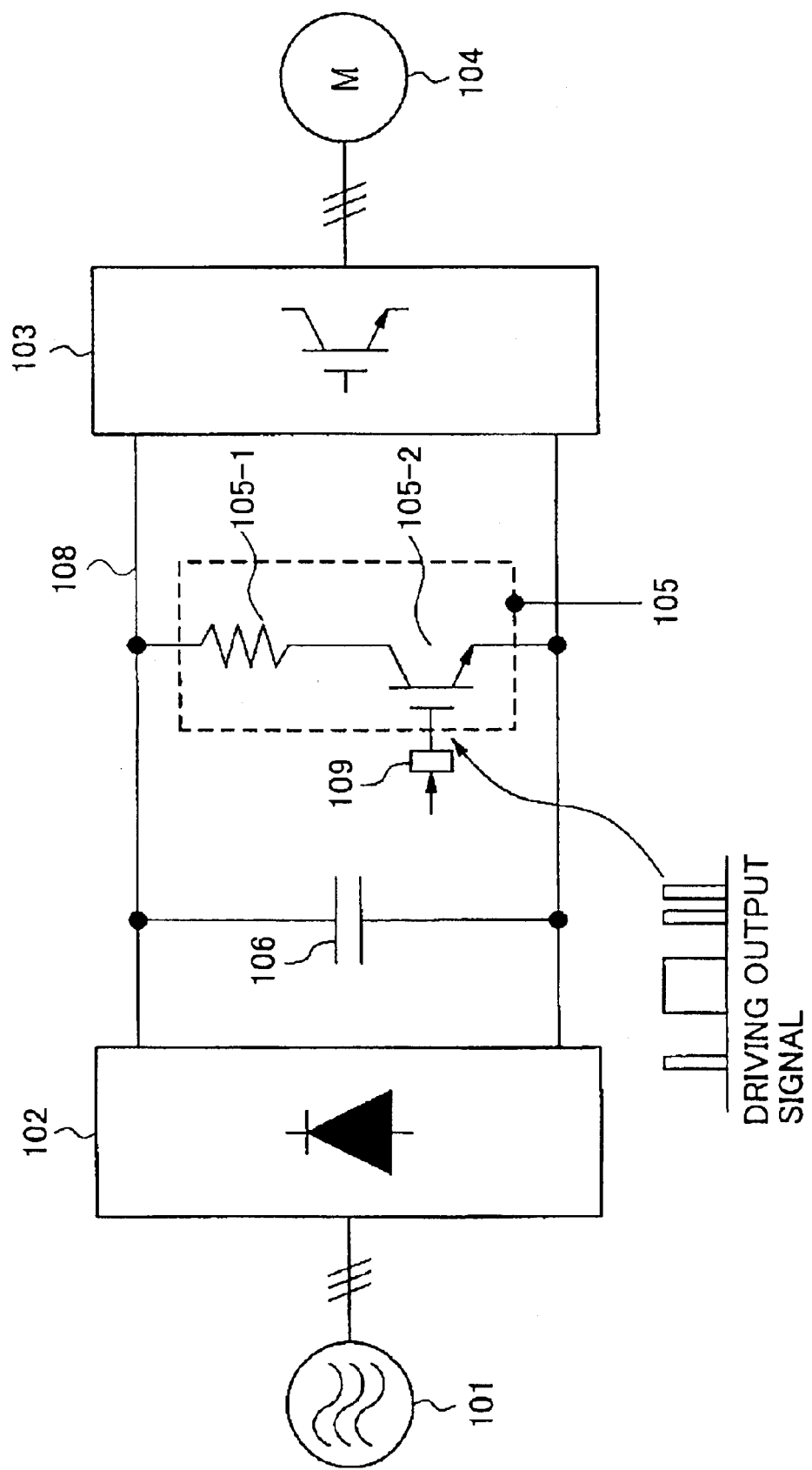
FIG. 3 is a schematic structural view of a driving circuit of a three-phase motor 104 disposed with a dynamic brake apparatus 105 provided at the electric injection molding machine 10 of the first embodiment of the present invention.

FIG. 3 is a schematic structural view of a driving circuit of a three-phase motor 104 disposed with a dynamic brake apparatus 105 provided at the electric injection molding machine 10 of the first embodiment of the present invention.

Referring to FIG. 3, the driving circuit includes a converter part 102, an inverter part 103, a dynamic brake apparatus 105, and a smoothing capacitor 106.

The converter part 102 converts an alternating current being sent from a three-phase alternating current electric power source 101 to a direct current. The inverter part 103 converts the direct current being sent from the converter part 102 to an alternating current, so that the alternating current is supplied to a three-phase motor 104. The dynamic brake apparatus 105 is connected to a DC link part 108 provided between the converter part 102 and the inverter part 103. The capacitor 106 is connected to a part of the DC link part 108 provided between the converter part 102 and the dynamic brake apparatus 105.

The dynamic brake apparatus 105 includes a regenerative resistance part 105-1 and a switch element 105-2. Regenerative electric power of the motor 104 is consumed by the regenerative resistance part 105-1. The switch element 105-2 is on-off controlled by a controller 109. The dynamic brake apparatus 105 functions as an apparatus for consuming the regenerative electric power of the three-phase motor 104.

If the rotational speed of the three-phase motor 104 is reduced, the three-phase motor 104 acts not as an electric driving machine but as a generator-motor. Because of this, an electric current that is generated by the three-phase motor 104 is sent backward to the DC link part 108 so that a voltage of the DC link part 108 rises momentarily. Particularly, in a case where a molding cycle is short, a control for accelerating and decelerating the rotational speed of the three-phase motor 104 is implemented frequently, so that it is easy for the voltage of the DC link part 108 to rise.

In a case where the voltage of the DC link part 108 exceeds a predetermined value, a driving output signal for making the switch element 105-2 "on" is output from the controller 109. When the switch element 105-2 is made "on", the electric current is sent from the three-phase motor 104 to the regenerative resistance part 105-1 and thereby the regenerative electric power of the motor 104 is consumed by the regenerative resistance part 105-1.

In a case where the term for making the switch element 105-2 "on" is long, the term for consuming electric power by the regenerative resistance part 105-1 is long. In this case, the load on the dynamic brake apparatus 105 increases. In other words, the amount of the load on the dynamic brake apparatus 105 is in proportion to the duty of the driving output signal for making the switch element 105-2 "on" or "off".

Based on the above mentioned relationship between the amount of the load on the dynamic brake apparatus 105 and the duty of the driving output signal for making the switch element 105-2 "on" or "off", in this embodiment, the controller 109 performs filtering for the driving output signals (an "on" signal and an "off" signal) to the switch element 105-2. The controller 109 also estimates the load to the dynamic brake apparatus 105 based on the duty obtained by filtering. In addition, the controller 109 determines whether or not the dynamic brake apparatus 105 is in an overload state based on the estimated load.

In a case where the controller 109 determines that the dynamic brake apparatus 105 is in an overload state, the controller 109 performs an operation for protecting the regenerative resistance part 105-1 from the overload state, such as outputting a signal for stopping the molding operation of the electric injection molding machine 10 to a main control apparatus, not illustrated, of the electric injection molding machine 10.

Figure 4:
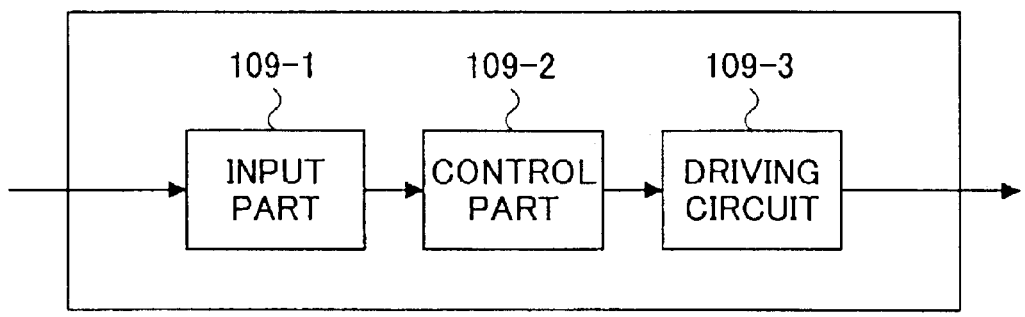
FIG. 4 is a schematic structural view of a controller 109 of FIG. 3.

FIG. 4 is a schematic structural view of the controller 109. Referring to FIG. 4, the controller 109 includes an input part 109-1, a control part 109-2, a driving circuit 109-3, and others. An arrow illustrated in FIG. 4 represents an input or an output of information or an order that is described later.

System control information is input to the input part 109-1 of the controller 109. The system control information is generated based on a feed back signal from a designated sensor provided at the dynamic brake apparatus 105, such as information regarding the voltage of the DC link part 108, an order for reducing the rotational speed of the three-phase motor 104 based on a molding pattern, or the like.

In this embodiment, a case where the information regarding the voltage of the DC link part 108 is input to the input part 109-1 will be described.

The system control information that is input to the input part 109-1 is output to the control part 109-2 by the input part 109-1. In a case where the control part 109-2 determines that the voltage of the DC link part 108 exceeds the designated value, a driving order for outputting the driving output signal for making the switch element 105-2 "on" is output to the driving circuit 109-3. Based on the above mentioned order, the regenerative electric power of the three-phase motor 104 shown in FIG. 3 is consumed by the regenerative resistance part 105-1.

The control part 109-2 performs filtering for the driving output signals (an "on" signal and an "off" signal) output to the switch element 105-2, so that the duty is detected. The control part 109-2 also estimates the load to the dynamic brake apparatus 105 based on the duty obtained by filtering. In addition, the control part 109-2 determines whether or not the dynamic brake apparatus 105 is in an overload state based on the estimated load.

Meanwhile, in a case where the regenerative electric power of the three-phase motor 104 that remarkably exceeds the rating of the regenerative resistance part 105-1 of the dynamic brake apparatus 105 is generated instantaneously, the duty of the driving output signals (the "on" signal and the "off" signal) becomes large, so that it seems as if the dynamic brake apparatus 105 is in the overload state.

However, if the above mentioned regenerative electric power is applied to the regenerative resistance part 105-1 for a relatively short period of time, it is actually possible for the regenerative resistance part 105-1 to permit a large duty. Because of this, the control part 109-2 of the controller 109 performs filtering by a time constant based on a property of the regenerative resistance part 105-1. The control part 109-2 detects the duty of the driving output signal base on the above mentioned filtering so that the load to the regenerative resistance part 105-1 is estimated. Here, the time constant is one parameter to determine the strength of the filtering.

Figure 5:
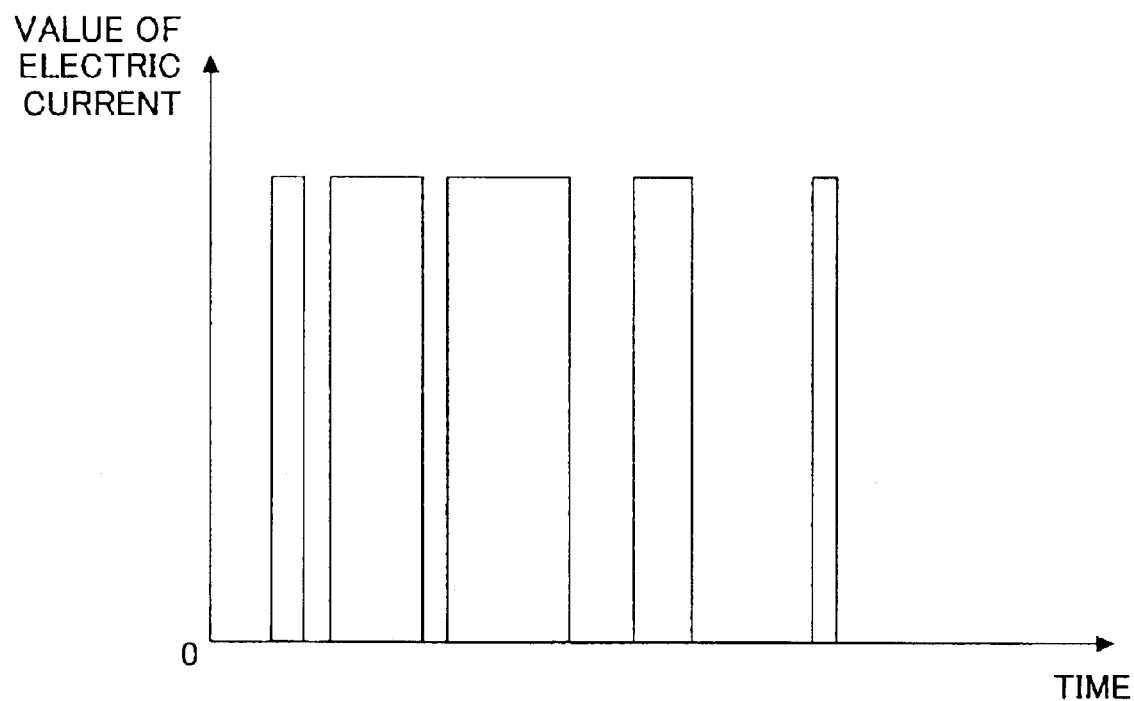
FIG. 5 is a graph showing a pattern of the electric current sent to a regenerative resistance part 105-1 of FIG. 3.

Next, filtering in this embodiment will be described. FIG. 5 is a graph showing a pattern of the electric current sent to the regenerative resistance part 105-1.

Referring to FIG. 5, the horizontal axis represents time and the vertical axis represents a value of electric current at the regenerative resistance part 105-1. An electric current pattern shown in FIG. 5 coincides with a pattern (illustrated in FIGS. 6 and 7 by a dotted lines) of the driving output signals (the "on" signal and the "off" signal) output from the control part 109-2 of the controller 109 to the switch element 105-2. The pattern of the driving output signals is defined by a molding pattern predetermined for the electric injection molding machine 10. In a case where the driving output signal is the "on" signal, the electric current has a maximum value. In a case where the driving output signal is the "off" signal, the electric current has a minimum value (zero value).

Filtering of the driving output signals (the "on" signal and the "off" signal) is implemented by dividing filter time constants into two kinds of the time constants, namely a small time constant $\tau_1$ and a large time constant $\tau_2$.

Figure 6:
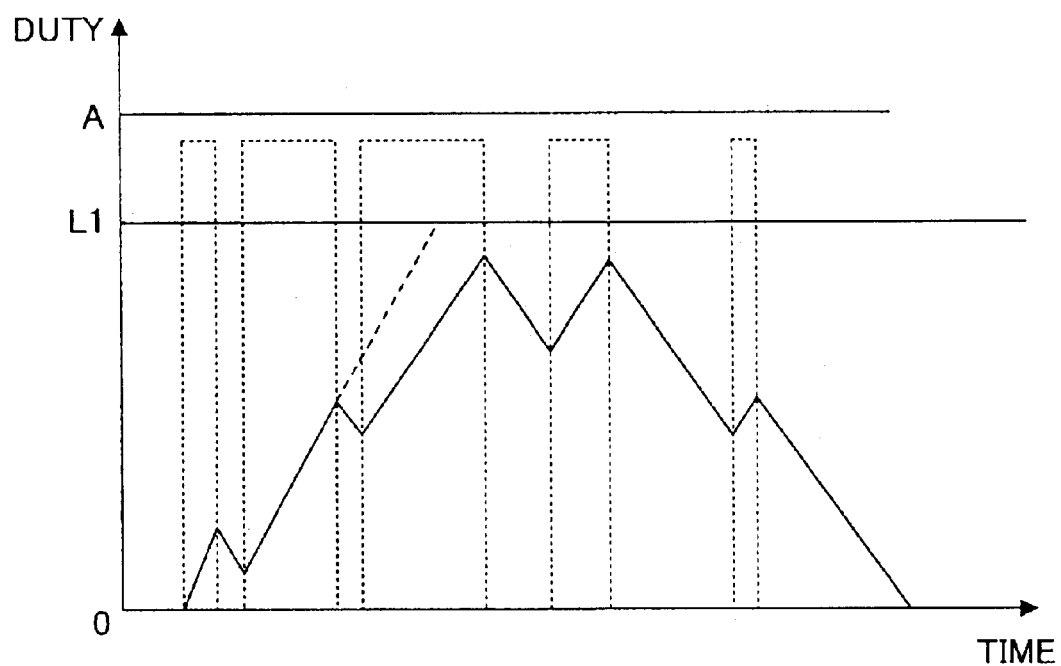
FIG. 6 is a graph showing a pattern (a waveform) of the electric current estimated by filtering to a driving output signal ("on" signal and "off" signal) with a small time constant $\tau_1$.

FIG. 6 is a graph showing a pattern (a waveform) of the electric current estimated by filtering of the driving output signals (the "on" signal and the "off" signal) with a small time constant $\tau_1$.

Referring to FIG. 6, the horizontal axis represents time and the vertical axis represents the duty, namely a calculated value of the electric current at the regenerative resistance part 105-1 after filtering.

In a case where filtering to the pattern (illustrated by the doted line in FIG. 6) of the driving output signals (the "on" signal and the "off" signal) is implemented by the time constant $\tau_1$, a waveform illustrated by a solid line in FIG. 6 is output. Here, the small time constant $\tau_1$ is used for filtering so as to set a threshold value of a load permitted by the regenerative resistance part 105-1 for a short period of time.

Furthermore, in FIG. 6, "A" represents an initial maximum permissible value that is predetermined, wherein the maximum permissible value is a maximum value of a load that can be given to the regenerative resistance part 105-1 so that the regenerative resistance part 105-1 is not burned.

As shown in FIG. 6, if the driving output signal for making the switch element 105-2 "on" is output from the controller 109 shown in FIG. 3, the electric current is given to the regenerative resistance part 105-1, and thereby the waveform in FIG. 6 goes in an upper right direction. Accordingly, if each of the duty is added so as to exceed the initial maximum permissible value A of the duty of the regenerative resistance part 105-1, the regenerative resistance part 105-1 is in the overload state. In order to prevent the regenerative resistance part 105-1 from being in the above mentioned overload state, a threshold value $L_1$ that the regenerative resistance part 105-1 can permit for a short period of time is set as a smaller value than the initial maximum permissible value A.

Figure 7:
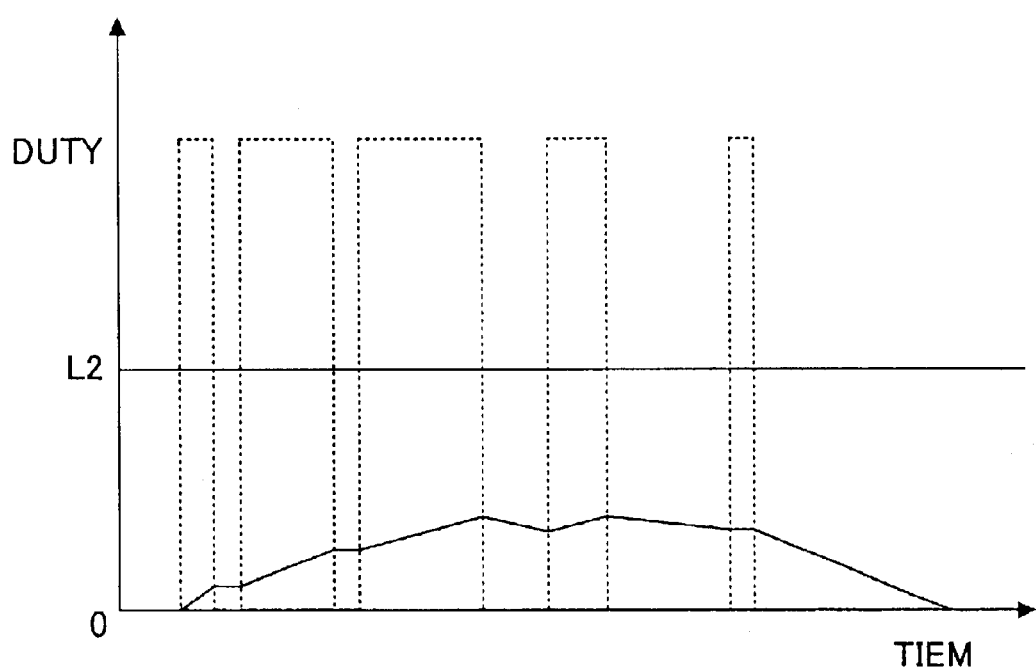
FIG. 7 is a graph showing a pattern (a waveform) of the electric current estimated by filtering to the driving output signal ("on" signal and "off" signal) with a large time constant $\tau_2$.

FIG. 7 is a graph showing a pattern (a waveform) of the electric current estimated by filtering to the driving output signal ("on" signal and "off"signal) with a large time constant $\tau_2$.

Referring to FIG. 7, the horizontal axis represents time and the vertical axis represents the duty, namely a calculated value of an electric current at the regenerative resistance part 105-1 after filtering.

In a case where filtering to the pattern (illustrated by the dotted lines in FIG. 7) of the driving output signals (the "on" signal and the "off" signal) is implemented by the time constant $\tau_2$, a waveform illustrated by a solid line in FIG. 7 is output. Here, the large time constant $\tau_2$ is used for filtering so as to set a threshold value of a load permitted by the regenerative resistance part 105-1 for a long period of time.

The slope of the wave form of the electric current shown in FIG. 7 is smaller than the slope of the wave form of the electric current shown in FIG. 6. That is, even if the driving output signal for making the switch element 105-2 "on" is output in the case shown in FIG. 7, the speed to add the duty is slower than the case shown in FIG. 6. In addition, even if the driving output signal for making the switch element 105-2 "off" is output in the case shown in FIG. 7, the speed to subtract the duty is slower than the case shown in FIG. 6.

Figure 8:
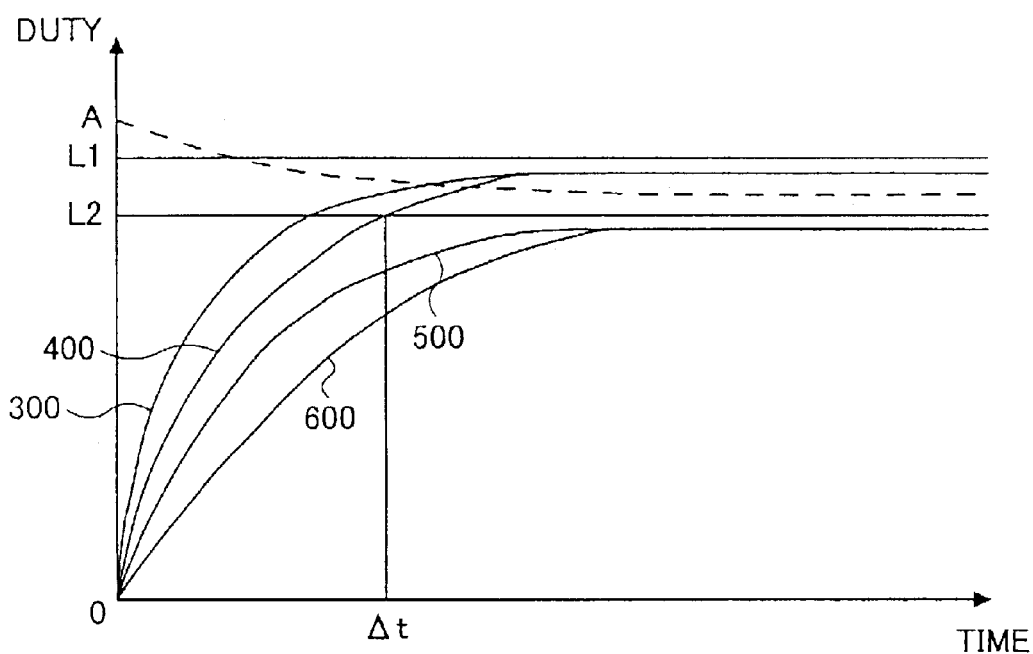
FIG. 8 is a graph showing a value of a duty as a result of filtering with the time constant $\tau_1$ shown in FIG. 6 and a value of a duty as a result of filtering with the time constant $\tau_2$ shown in FIG. 7, in a case where a molding condition 1 or a molding condition 2 is set as a driving condition so that a molding operation is repeated.

Meanwhile, the substantially same molding operation is repeated consecutively in the electric injection molding machine 10. FIG. 8 is a graph showing a value of the duty as a result of filtering with the time constant $\tau_1$ shown in FIG. 6 and a value of the duty as a result of filtering with the time constant $\tau_2$ shown in FIG. 7, in a case where a molding condition 1 or a molding condition 2 is set as a driving condition so that the molding operation is repeated.

Referring to FIG. 8, in a case where the molding condition 1 is set as the driving condition, the value (illustrated by a line 300 in FIG. 8) of the duty as a result of filtering by the time constant $\tau_1$ increases for a short period of time, as compared with the value (illustrated by a line 400 in FIG. 8) of the duty as a result of filtering by the time constant $\tau_2$.

On the other hand, as described above, in a case where filtering is implemented by the time constant $\tau_2$, the speed to subtract the duty is slow, as compared with the case where filtering is implemented by the time constant $\tau_1$ (See FIG. 7). Accordingly, as shown in FIG. 8, after a designated period of time passes, both the value (illustrated by a line 300 in FIG. 8) of the duty as a result of filtering by the time constant $\tau_1$ and the value (illustrated by a line 400 in FIG. 8) of the duty as a result of filtering by the time constant $\tau_2$ eventually become the same and constant value.

In a case where the molding condition 2 is set as the driving condition, as well as the case where the molding condition 1 is set as the driving condition, the value (illustrated by a line 500 in FIG. 8) of the duty as a result of filtering by the time constant $\tau_1$ increases for a short period of time, as compared with the value (illustrated by a line 600 in FIG. 8) of the duty as a result of filtering by the time constant $\tau_2$. After a designated period of time passes, both the value (illustrated by a line 500 in FIG. 8) of the duty as a result of filtering by the time constant $\tau_1$ and the value (illustrated by a line 600 in FIG. 8) of the duty as a result of filtering by the time constant $\tau_2$ eventually become the same and constant value.

Meanwhile, as shown in FIGS. 6 and 8, at the time when the electric injection molding machine 10 starts working, it is possible to permit a large duty as long as the duty does not exceed the initial maximum permissible value A. However, because of deterioration of the property of the regenerative resistance part 105-1 due to radiation of heat of the regenerative resistance part 105-1, a maximum permissible value (illustrated by a dotted line in FIG. 8) of the duty of the regenerative resistance part 105-1 is reduced with the passing of time so as to become a constant value eventually.

Accordingly, in a case where the electric injection molding machine 10 works consecutively for a long period of time, a smaller value than the maximum permissible value of the duty of the regenerative resistance part 105-1 that eventually becomes a constant value, can be set as a threshold value $L_2$ of the overload. The threshold value $L_2$ of the overload can be permitted by the regenerative resistance part 105-1 for a long period of time. Because of this, the regenerative resistance part 105-1 is protected from the overload state.

In a case where the molding condition 1 is set as the driving condition, if the electric injection molding machine 10 works consecutively for a long period of time, the duty exceeds the maximum permissible value of the duty of the regenerative resistance part 105-1. However, at the time of $\Delta t$ (See FIG. 8) when the duty exceeds the threshold value $L_2$, the order for stopping the three-phase motor 140 is output so as to protect the regenerative resistance part 105-1.

In a case where the molding condition 2 is set as the driving condition, since the duty is smaller than the threshold value $L_2$, it is possible to work the electric injection molding machine continuously.

Here, Δt (See FIG. 8) represents a term from starting molding to the time when the duty has the threshold value $L_1$, in a case where filtering is implemented by the time constant $τ_1$, or a term from starting molding to the time when the duty has the threshold value $L_2$, in a case where filtering is implemented by the time constant $τ_2$.

Figure 9:
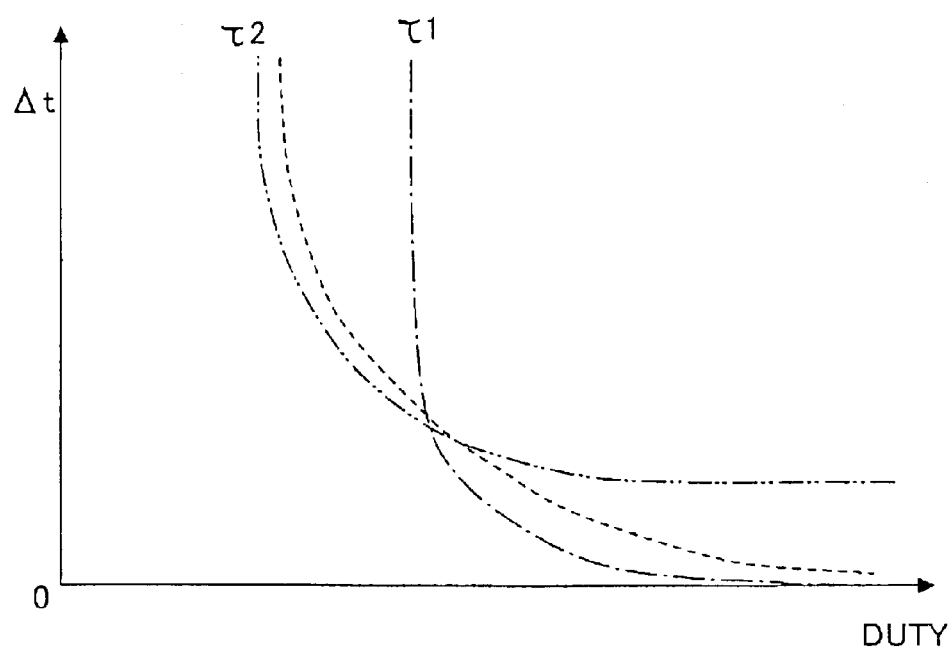
FIG. 9 is a graph showing a relationship between a duty at any time and a term $\Delta t$ from the time of starting molding to a time for the duty to reach a threshold value $L_1$ or $L_2$.

FIG. 9 is a graph showing a relationship between a duty at any time and a term Δt from the time of starting molding to the time for the duty to reach a threshold value $L_1$ or $L_2$. In FIG. 9, the horizontal axis represents the duty and the vertical axis represents Δt.

Referring to FIG. 9, a case where filtering is implemented by the time constant $τ_1$ is illustrated by the one point dotted line. A case where filtering is implemented by the time constant $τ_2$ is illustrated by the two points dotted line. As shown in FIG. 9, in either case, if the duty is large, the term where the duty has the threshold value $L_1$ or $L_2$ is short, and if the duty is small, the term where the duty has the threshold value $L_1$ or $L_2$ is long.

Thus, since filtering is implemented by a plurality of the filter time constants, it is possible to easily make a threshold value of the regenerative resistance part 105-1 regarding the load close to the maximum permissible value of the regenerative resistance part 105-1, by arranging the sensitivity to a change of the load, under consideration of the property (illustrated by a dotted line in FIG. 8) of the regenerative resistance part 105-1. Hence, it is possible to increase the precision to protect the regenerative resistance part 105-1 from the overload state.

Accordingly, based on the result of the above mentioned filtering, in a case where the control part 109-2 determines the regenerative resistance part 105-1 of the dynamic brake apparatus 105 is in the overload state, the control part 109-2 outputs to the main control apparatus (not illustrated) of the electric injection molding machine 10 a signal for stopping the molding operation of the electric injection molding machine 10. As a result of this, the operation of the electric injection molding machine 10 is stopped or inhibited or a warning against the operation is given to the electric injection molding machine 10. Because of this, the regenerative resistance part 105-1 is protected from the overload state.

Hence, the regenerative electric power generated by the three-phase motor 104 is consumed by the regenerative resistance part 105-1 efficiently. In addition, it is possible to protect the dynamic brake apparatus 105 precisely by setting threshold values corresponding to the property of the regenerative resistance part 105-1 of the dynamic brake apparatus 105. Furthermore, braking of the electric injection molding machine 10 can be implemented efficiently.

In this embodiment, an example where two kinds of the threshold values are used. However, more than two kinds of the threshold values may be used so that it is possible to make a threshold value of the regenerative resistance part 105-1 regarding the load close to the maximum permissible value of the regenerative resistance part 105-1. That is, it is possible to set a molding condition that makes the threshold value of the regenerative resistance part 105-1 regarding the load quite similar to the maximum permissible value of the regenerative resistance part 105-1, to the electric injection molding machine 10. As a result of this, it is possible to make the molding cycle of the electric injection molding machine 10 faster and make the permissible load from the three-phase motor 104 larger. Accordingly, it is possible to make molding products more efficiently by the electric injection molding machine 10.

Thus, it is possible to protect the dynamic brake apparatus 105 provided for the three-phase motor 4 equipped as an actuator, from an overload state by a simple structure. Hence, it is possible to implement a brake operation for the electric injection molding machine 10 efficiently.

The above mentioned threshold values for determining whether or not the regenerative resistance part 105-1 is in an overload state or kinds and values of the filter time constants are properly determined based on a specific value of the dynamic brake apparatus 105 such as a rated electric current and a rated electric power. In addition, the motor 104 is not limited to a three-phase motor.

Furthermore, although the information regarding the voltage of the DC link part 108 is used as the system control information that is input to the input part 109-1 of the controller 109 in the above mentioned embodiment, the present invention is not limited to the information regarding the voltage of the DC link part 108. The order for reducing the rotational speed of the three-phase motor 104 based on the molding pattern or the like may be used for the present invention.

Figure 10:
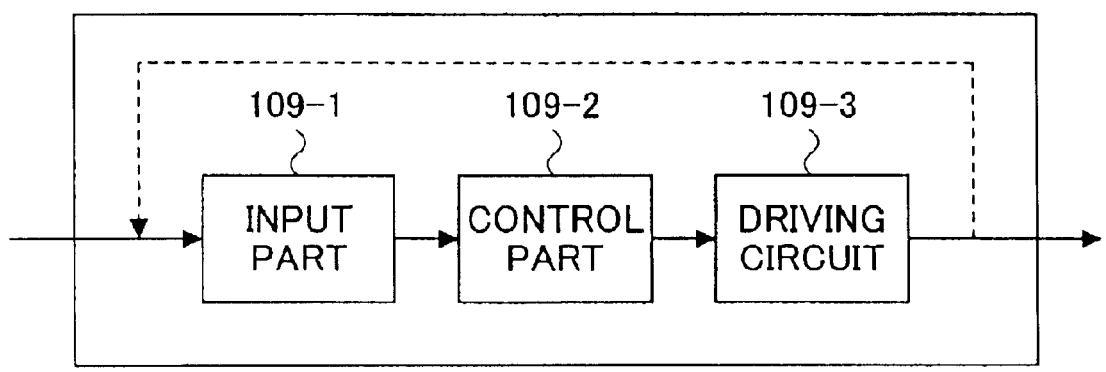
FIG. 10 is a schematic structural view of a controller of the second embodiment of the present invention.

Next, the second embodiment of the present invention will be described. FIG. 10 is a schematic structural view of a controller of the second embodiment of the present invention. In FIG. 10, parts that are the same as the parts shown in FIG. 4 are given the same reference numerals, and explanation thereof will be omitted.

In the above mentioned first embodiment, the controller 109 estimates the load to the dynamic brake apparatus 105 based on the duty of the driving output signal to the switch element 105-1. In the second embodiment of the present invention, whether or nor the dynamic brake apparatus 105 is in an overload state is determined, by both the driving output signal output from the controller 109 and a lead back value of the driving output signal. That is, filtering is implemented to the lead back value of the driving output signal as well as the driving output signal, so that whether or nor the dynamic brake apparatus 105 is in an overload state is determined.

For instance, it is assumed that although the duty obtained based on the driving output signal (the "on" signal and the "off" signal) is lower than the designated threshold value, the duty obtained based on the lead back value of the driving output signal is higher than the designated threshold value.

In this case, the control part 109-2 determines that the dynamic brake apparatus 105 is in an overload state as a result of the dynamic brake apparatus 105 continuing working although a control signal system such as the driving circuit 109-3 and others is in some abnormal state. Based on the above mentioned determination, the controller 109 implements an operation for protecting the dynamic brake apparatus 105 from the overload state. Because of this, it is possible to further increases the reliability regarding protection of the dynamic brake apparatus 105 from the overload state.

The present invention is not limited to these embodiments, but variations and modifications may be made without departing from the scope of the present invention. For example, the controller 109 can estimate the load to the dynamic brake apparatus 105 based on the duty of the only lead back value of the driving output signal to the switch element 105-1, so that whether or nor the dynamic brake apparatus 105 is in an overload state can be determined.

In addition, for example, although the electric injection molding machine is described in the above mentioned embodiments, the present invention can be applied to a hybrid type injection molding machine that takes in beneficial points of both a hydraulic and the electric injection molding machines.

This patent application is based on Japanese priority patent application No. 2001-321318 filed on Oct. 19, 2001, the entire contents of which are hereby incorporated by reference.

What is claimed is:

1. An injection molding machine, comprising:

an electric driving machine for actuating a portion of the injection molding machine;

a dynamic brake apparatus which is provided for the electric driving machine and consumes regenerative electric power of the electric driving machine as a load; and a controller configured to output a driving output signal to the dynamic brake apparatus so as to control the regenerative electric power of the electric driving machine that the dynamic brake apparatus consumes, wherein the controller estimates the load to the dynamic brake apparatus based on the driving output signal output to the dynamic brake apparatus and determines whether or not the dynamic brake apparatus is in an overload state based on the estimated load.

2. The injection molding machine as claimed in claim 1, wherein the dynamic brake apparatus includes a switch element that is on-off controlled by the driving output signal output from the controller.

3. The injection molding machine as claimed in claim 2, wherein the controller calculates a duty of the driving output signal for making the switch element "on" or for making the switch element "off" and estimates the load to the dynamic brake apparatus based on the duty.

4. The injection molding machine as claimed in claim 3, wherein the controller calculates the duty by filtering the driving output signal for making the switch element "on" or for making the switch element "off".

5. The injection molding machine as claimed in claim 4, wherein the dynamic brake apparatus further includes a regenerative resistance part for consuming the regenerative electric power of the electric driving machine, and the filtering is implemented by a plurality of time constants corresponding to a property of the regenerative resistance part.

6. The injection molding machine as claimed in claim 5, wherein the respective plurality of time constants are defined to increase and decrease the duty calculated by filtering.

7. The injection molding machine as claimed in claim 4, wherein in a case where the controller determines that the dynamic brake apparatus is in the overload state based on a result of the filtering, if a term wherein the overload state continues is within a predetermined term, then the controller permits the dynamic brake apparatus to be given the load by a predetermined value; and if the term wherein the overload state continues exceeds the predetermined term, then the controller performs an operation to protect the dynamic brake apparatus.

8. The injection molding machine as claimed in claim 1, wherein the controller determines whether or not the dynamic brake apparatus is in the overload state by the driving output signal and a lead back value of the driving output signal.

9. The injection molding machine as claimed in claim 3, wherein the controller determines whether or not the dynamic brake apparatus is in the overload state by comparing the duty of the driving output signal and a duty of a lead back value of the driving output signal.

10. The injection molding machine as claimed in claim 2, wherein the controller calculates a duty of a lead back value of the driving output signal for making the switch element "on" or for making the switch element "off" and estimates the load to the dynamic brake apparatus based on the duty.

* * * * *